United States Patent [19]

Davis

[11] Patent Number: 5,305,859
[45] Date of Patent: Apr. 26, 1994

[54] LIQUID SPRING HAVING IMPROVED DAMPER VALVE STRUCTURE

[76] Inventor: Leo W. Davis, 15711 Regal Hill Cir., Dallas, Tex. 75248

[21] Appl. No.: 882,067

[22] Filed: May 12, 1992

[51] Int. Cl.$^5$ ............................................. F16F 9/50
[52] U.S. Cl. .................................. 188/282; 188/320; 188/322.17; 267/127
[58] Field of Search ............................ 267/64.13, 127; 188/282, 284, 317, 320, 268, 322.15; 137/513.3, 270

[56] References Cited

U.S. PATENT DOCUMENTS

| | | | |
|---|---|---|---|
| 2,637,414 | 5/1953 | Patriquin | 188/317 X |
| 3,420,273 | 1/1969 | Greer | 137/513.3 X |
| 3,598,205 | 8/1971 | Kenyon | 188/284 X |
| 4,452,436 | 6/1984 | Gute | 188/282 X |
| 4,558,767 | 12/1985 | Taylor | 188/282 |
| 4,561,641 | 12/1985 | DeYoung et al. | 267/64.13 |
| 4,735,402 | 4/1988 | Davis | 267/64.13 |
| 4,877,222 | 10/1989 | Davis | 267/64.13 |
| 5,152,379 | 10/1992 | Sackett et al. | 188/320 X |

FOREIGN PATENT DOCUMENTS

| | | | |
|---|---|---|---|
| 1236014 | 6/1960 | France | 137/513.3 |
| 127137 | 8/1982 | Japan | 267/64.13 |

Primary Examiner—Robert J. Oberleitner
Assistant Examiner—Lee W. Young
Attorney, Agent, or Firm—Konneker Bush Hitt & Chwang

[57] ABSTRACT

A vehicular suspension system includes a liquid spring operatively interconnected between a vehicle frame and an associated wheel assembly to provide resistive spring and damping forces in response to relative vertical displacement between the frame and wheel assembly. The liquid spring includes a cylinder secured to the vehicle frame and having a compressible liquid-filled internal chamber in which a piston structure is reciprocally disposed and divides the chamber into bounce and rebound chambers. A rod is slidably and sealingly carried by the cylinder for axial movement into and out of the chamber, the rod having an inner end anchored to the piston structure, and an outer end portion extending outwardly from the cylinder and secured to the wheel assembly. A flow passage extends through the piston and intercommunicates the bounce and rebound subchambers. An intermediate portion of the flow passage is defined by a valve chamber disposed within the piston structure and captively retaining a movable damper valve. The damper valve is operable to restrict liquid flow through the piston passage in a manner providing greater resistance to liquid flow in one direction between the bounce and rebound subchambers than in the other direction in response to axial rod movement into and out of the cylinder chamber. The directional liquid flow restriction differential of the damper valve may be conveniently reversed simply by reversing the orientation of the damper valve within the internal piston structure valve chamber.

2 Claims, 3 Drawing Sheets

LIQUID SPRING HAVING IMPROVED DAMPER VALVE STRUCTURE

BACKGROUND OF THE INVENTION

The present invention relates generally to vehicular suspension systems, and more particularly relates to liquid springs utilized in such suspension systems.

In the past, various proposals have been made for replacing the conventional hydraulic shock absorber and exterior coil spring assemblies in vehicular suspension systems with more compact devices commonly referred to as liquid springs. A conventional liquid spring generally comprises a cylindrical housing having an internal chamber with a compressible liquid therein, a piston reciprocably disposed in the chamber and axially dividing it into bounce and rebound subchambers, a rod structure secured to the piston and axially movable into and out of the chamber, the rod structure having an external portion projecting outwardly from one of the housing ends.

With the liquid spring operatively interconnected between the vehicle frame and an associated wheel support structure, the compressible working liquid generates both spring and damping forces in the suspension system in response to relative axial translation between the rod structure and housing portion of the liquid spring in response to relative axial translation between the rod structure and the housing created by relative vertical displacement between the wheel structure and the frame.

The compressible working liquid permits the suspension system to exhibit a non-linear force/deflection curve. This non-linear force/deflection relationship is quite advantageous because it provides lower spring rates during normal operation and higher spring rates when the vehicle strikes a bump. Non linearity in the liquid spring-based suspension system is achieved via the compressibility of the silicone-based working liquid, which is approximately 1.5 to 2 times more compressible than conventional hydraulic fluid. In operation, the non-linear suspension system provides a spring rate which increases exponentially when the rod structure is moved from its normal static position relative to the cylinder housing to its fully retracted position within the cylinder housing. This increased spring force capability permits the liquid spring-based suspension system to easily absorb sharp bumps without bottoming out. In contrast, if the spring rate was linear, a substantially greater piston stroke would be required to enable the suspension system to absorb comparable bounce forces.

Conventional liquid spring suspension systems can be tuned and readily adjusted for differing vehicle weights (using the spring force of the liquid springs used in the suspension system), and for differing ride characteristics (using the damping forces of the liquid springs). It will thus be appreciated that liquid springs, via their utilization of a compressible working liquid to create both spring and damping forces, have a potential for significantly improved suspension performance compared to conventional hydraulic shock absorbers and associated exterior coil spring assemblies commonly used in vehicular suspension systems.

In an attempt to fully realize this potential, various improvements and refinements to the basic liquid spring structure described above have heretofore been proposed. One such proposed improvement, illustrated and described in U.S. Pat. Nos. 4,735,402 and 4,877,222, has been to provide what may be termed differential damping between the bounce and rebound strokes of the liquid spring - i.e., causing the damping force of the liquid spring in its bounce mode to be less than the damping force in its rebound mode.

Under this concept, as illustrated in these two patents, a flow passage system is extended generally axially through the piston and intercommunicates the bounce and rebound subchambers. Accordingly, when the piston moves through its bounce stroke liquid in the bounce chamber is forced into the rebound chamber through the piston passageway system, and when the piston moves through its rebound stroke liquid in the rebound chamber is forced into the bounce chamber through the passageway system. To provide the desired bounce/rebound damping force differential, a damper valve is slidably mounted on the rod structure between the piston and the cylinder housing end closure member through which the rod structure slidably and outwardly extends. The valve cooperates with the piston passageway system to restrict liquid flow through the passageway system in a manner such that the resistance to liquid flow from the bounce subchamber into the rebound subchamber is less than the resistance to liquid flow from the rebound subchamber into the bounce subchamber.

While as a general proposition this differential damping valve is suitable for its intended purpose, due to its positioning within the liquid spring it is unavoidably subjected to high mechanical impact forces that tend to wear away its critical sealing surface portions thereby creating valve leakage and resulting undesirable deviation from the intended directional flow resistance differential provided by the valve. This mechanical impact to which the damper valve is subjected arises from its additional use as a sealing and pressure relief structure which, as the piston is driven to its rebound limit position, enters and bottoms out within a complementarily configured recess in the closure member to protect the rod seal structure from liquid pressure damage and resulting leakage. Because of this positioning and additional use of the slidable damper valve illustrated in U.S. Pat. Nos. 4,735,402 and 4,877,222, the damper valve is forcibly slammed between the piston and the closure member each time the piston is driven through its maximum rebound stroke, thereby accelerating valve wear and leakage as described above.

In view of these problems and disadvantages associated with this conventional damper valve, it is accordingly an object of the present invention to provide a liquid spring having an improved differential damping system which eliminates or at least substantially minimizes such problems and disadvantages.

SUMMARY OF THE INVENTION

In carrying out principles of the present invention, in accordance with a preferred embodiment thereof, a vehicular suspension system is provided which utilizes a specially designed liquid spring having an improved differential damping system incorporated therein. The liquid spring is operatively interconnected between the vehicle frame and an associated wheel structure to provide resistive spring and damping forces in response to relative vertical translational movement between the frame and the wheel structure.

The improved liquid spring comprises a cylinder structure having a chamber disposed therein and containing a compressible working liquid, representatively a silicone-based liquid. A piston structure is reciprocably disposed within the cylinder and axially divides it into bounce and rebound subchambers. A rod is slidably and sealingly carried by the cylinder for axial movement into and out of the cylinder chamber, the rod being fixedly secured at an inner end thereof to the piston structure and having an outer end portion disposed outwardly of the cylinder. In an illustrated preferred embodiment of the liquid spring, the rod slidably extends through an annular rod seal structure carried by a closure member threaded into an open end of the cylinder.

Passage means extend generally axially through the piston structure and intercommunicate the bounce and rebound subchambers. The passage means are operative to permit compressible liquid to flow therethrough from the bounce subchamber into the rebound subchamber in response to axial movement of the rod into the cylinder chamber, and to permit compressible liquid to flow therethrough from the rebound subchamber into the bounce subchamber in response to axial movement of the rod out of the cylinder chamber.

According to a feature of the present invention, an axially intermediate portion of the passage means is defined by a valve chamber disposed within the interior of the piston structure. Damper valve means are captively and movably retained within the valve chamber and are operative to restrict liquid flow through the piston structure passage means in a manner providing greater resistance to liquid flow in one direction between the bounce and rebound subchambers than in the other direction.

Because the damper valve means are protectively disposed within the interior of the piston structure, and not slidably retained on the rod between the piston structure and the cylinder closure member, the damper valve means are not subjected to forcible mechanical impact between the piston structure and the closure member. Instead, they are subjected only to liquid-driven movement within the protective valve chamber. Accordingly, valve wear and resulting valve leakage are significantly reduced.

Additionally, the damper valve means are not utilized in the present invention as a pressure relief structure that enters a complementarily configured recess in the closure member to protect the rod seal structure from potentially damaging pressure spikes when the piston structure is driven to the limit of its rebound stroke. Instead, this function is performed in the present invention by an integral portion of the piston structure through which the passage means outwardly extend. A resilient cushioning member fitted into the closure member recess receives this integral piston structure portion when the piston structure reaches the limit of its rebound stroke, thereby functioning as resilient bumper means for preventing rigid contact between the piston structure and the closure member.

According to another feature of the invention, the damper valve means are reversible within the protective interior piston structure valve chamber and are operative, when so reversed therein, to correspondingly reverse their directional liquid flow restriction differential. Thus, in one installed position within the piston structure valve chamber, the damper valve means create a rebound stroke damping force greater than the bounce stroke damping force. When reversed within their protective valve chamber, the damper valve means create a bounce stroke damping force greater then the rebound stroke damping force of the improved liquid spring.

DETAILED DESCRIPTION

Figure 1:
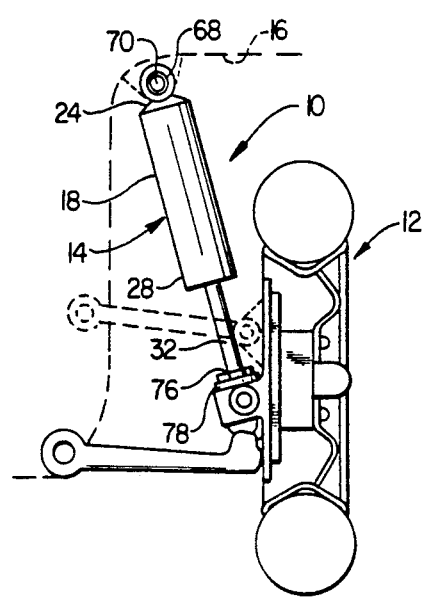
FIG. 1 is a simplified schematic view of a portion of a vehicle suspension system in which a wheel assembly is operatively connected to the vehicle frame using an improved liquid spring embodying principles of the present invention.
Figure 3:
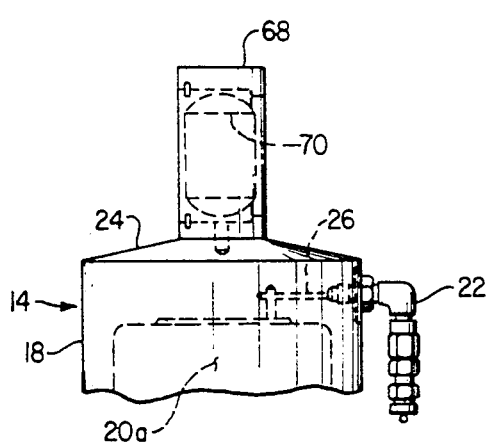
FIG. 3 is a right side elevational view of an upper end portion of the liquid spring shown in FIG. 1.
Figure 2:
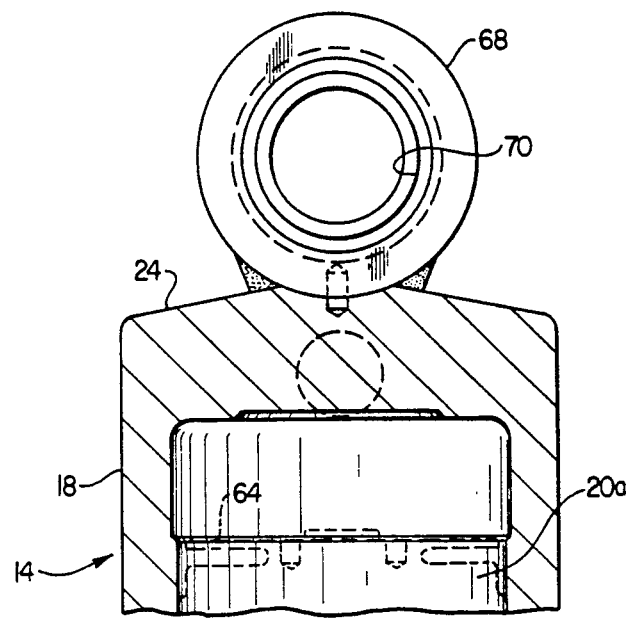
FIG. 2 is an enlarged scale, axially foreshortened cross-sectional view, partly in elevation, through the liquid spring.

Referring initially to FIGS. 1-3, the present invention provides a vehicular suspension system 10 (FIG. 1) in which, at each of the vehicle's wheel assemblies 12, a specially designed liquid spring 14 is operably interconnected between the wheel assembly and the vehicle frame 16 to provide resistive spring and damping forces in response to relative vertical movement between the wheel assembly 12 and the frame 16 during vehicle operation. Liquid spring 14 includes a cylinder 18 having an internal chamber 20 filled with a pressurized, silicone-based compressible liquid through an inlet fitting 22 (FIG. 3) adjacent the closed upper end of the cylinder, and associated fill porting 26 extending through the upper cylinder end.

Figure 4:
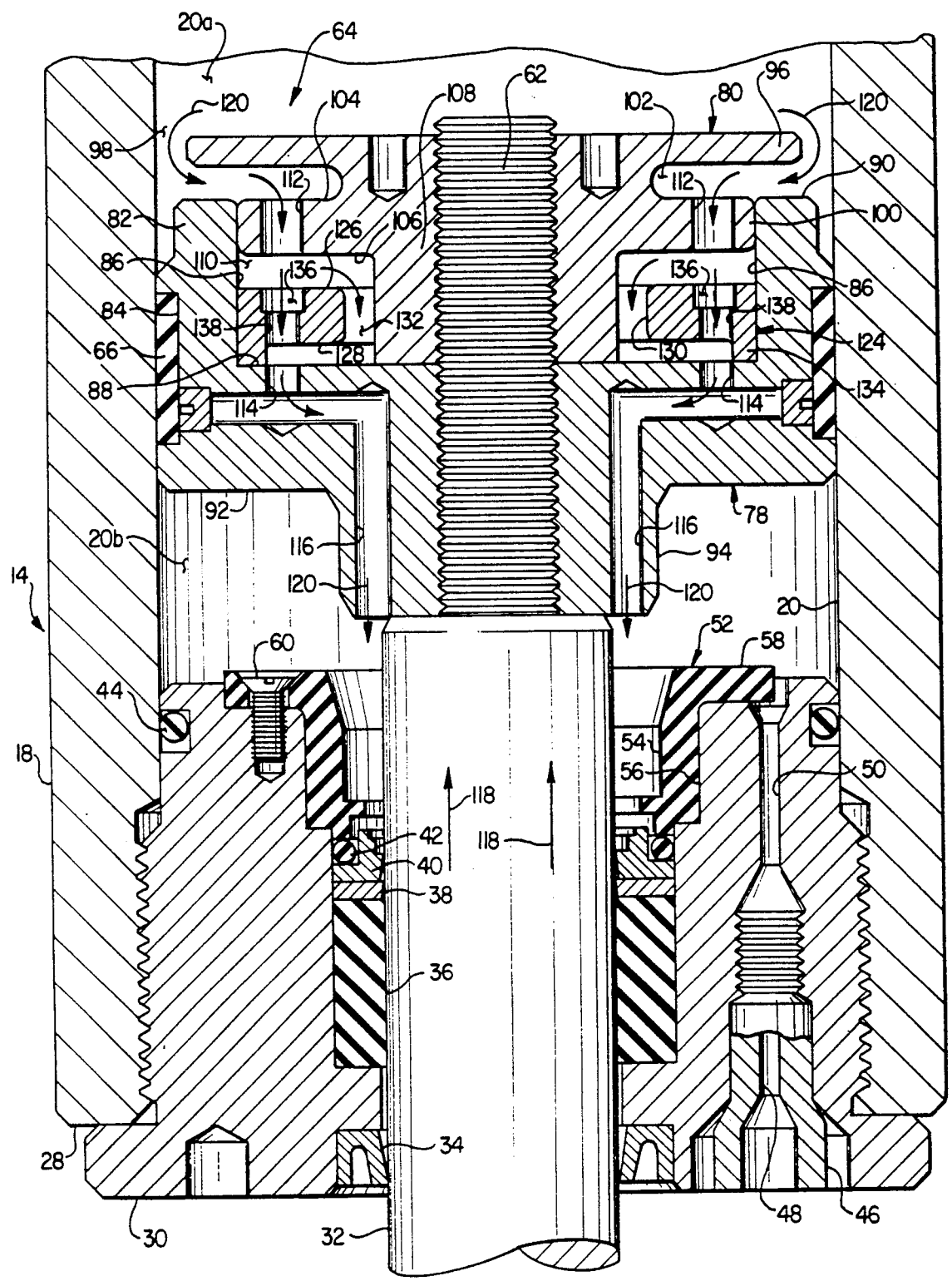
FIGS. 4 and 4A are enlarged scale partial cross-sectional views, partly in elevation, through the liquid spring respectively illustrating the interchamber liquid flow metering action of a damper valve portion thereof during axial bounce and rebound deflections of the liquid spring.

As illustrated in FIGS. 2 and 4, the cylinder 18 has an open lower end 28 into which an annular closure member 30 is threaded. A rod 32 slidably extends through the closure member 30 and is sealingly engaged by a rod seal system comprising the indicated annular seal elements 34, 36, 38, 40 and 42. The closure member 30 is sealed within the bore of cylinder 18 by an O-ring seal 44. A bleed valve member 46, having an internal air bleed passage 48, is threaded into a passage 50 axially extending through the closure member 30. When the cylinder 18 is initially filled with pressurized compressible liquid (with the rod end of the liquid spring extending upwardly), the bleed valve 46 is partially loosened to vent air from the cylinder interior, through the valve passage 48, and then retightened to seal the passage 50.

For purposes later described, an annular resilient cushioning member 52 is provided. The cushioning member 52 has a tubular body 54 closely received in a counterbore 56 formed in the inner end of the closure member 30, and an annular external flange portion 58 which overlies the inner end of closure member 30 and is secured thereto by a circumferentially spaced series of recessed screws 60 (only one of which is shown).

An externally threaded, reduced diameter inner end portion 62 of the rod 32 is coaxially secured to an internally threaded, two piece cylindrical piston structure 64. The piston structure 64 is slidably and reciprocably carried within the cylinder 18 by an annular seal member 66, and axially divides the liquid-filled chamber 20 into a bounce subchamber 20a positioned between the piston structure 62 and the upper cylinder end 24, and a rebound subchamber 20b positioned between the piston structure 62 and the closure member 30. The rod 32 is retractable from the piston 18 to a maximum rebound stroke limit position in which the piston structure 64 is brought to its solid line lower limit position shown in FIG. 2, and is extendable into the cylinder 18 to a maximum bounce stroke limit position in which the piston structure 64 is brought to its upper limit dotted line position shown in FIG. 2.

The closed upper end 24 of cylinder 18 has a connector ring 68 that internally carries a spherical bearing 70 connectable to the vehicle frame 16 as shown in FIG. 1. In a similar fashion, a connector ring 72, having a spherical bearing 74 mounted therein, is secured to the lower or outer end of the rod 32 and is operably connectable to the wheel assembly 12 as shown in FIG. 1. When the rod 32 upwardly reaches the limit of its bounce stroke, the bottom end of the closure member 30 is brought into resilient abutment with a belleville washer 76 circumscribing the lower end of the rod 32 and downwardly engaging an annular backup plate 78 affixed to the rod. The washer 76 thus functions as a resilient external bumper member for the liquid spring.

Referring now to FIG. 4, the piston structure 64 includes a piston member 78 and a locking member 80, each centrally threaded onto the inner rod end portion 62 as shown. The piston member 78 has a cylindrical body portion 82 having formed therein an annular exterior side surface groove 84 that receives the sliding seal member 66. A central counterbore 86, having an inner end surface 88, extends inwardly through the upper end surface 90 of the piston member body portion 82. Centrally projecting downwardly from the piston member body portion 82 is a reduced diameter cylindrical outer end portion 94 which, for purposes later described, is formed as an integral part of the overall piston structure 64 and is diametrically sized to be closely received within the tubular body portion 54 of the resilient cushioning member 52 as the rod downwardly approaches the lower limit of its rebound stroke.

Still referring to FIG. 4, the locking member 80 has, at its upper end, an annular flange portion 96. Flange portion 96 has an outer diameter somewhat smaller than the bore diameter of the cylinder 18. Accordingly, an annular clearance space 98 is formed between the periphery of the flange 96 and the interior side surface of the cylinder 18. The locking member 80 also has a cylindrical intermediate body portion 100 which is closely received in an upper end of the counterbore 86 and is separated from the flange 96 by an annular groove 102. Intermediate body portion 100 has an upper end surface 104 and a lower end surface 106. Extending downwardly from a central are of the intermediate body portion 100 is a reduced diameter cylindrical end portion 108 having a lower end that abuts the bottom end surface 88 of the counterbore 86.

With the piston structure portions 78,80 operatively threaded onto the rod end portion 62 as shown in FIG. 4, the portions 78,80 define therebetween an annular valve chamber 110 which coaxially circumscribes the rod end portion 62 and is disposed within the interior of the piston structure 64. The valve chamber 110 forms an intermediate portion of a liquid passageway system that extends generally axially through the piston structure 64 and intercommunicates the bounce and rebound subchambers 20a,20b through the piston structure interior.

In addition to the axially intermediate valve chamber 110, this liquid passageway system includes the annular clearance space 98; the annular groove 102; a circumferentially spaced series of passages 112 formed through the locking member intermediate portion 100 and intercommunicating the annular groove 102 with the valve chamber 110; a circumferentially spaced series of passages 114 extending axially outwardly through inner counterbore end surface 88 and radially aligned with the passages 112; and a series of generally L-shaped passages 116 formed in the piston member 78 beneath the valve chamber 110. Each of the passages 116 has a radially extending portion communicating with one of the passages 114, and an axially extending portion opening outwardly through the lower end of the outer piston member end portion 94.

When the piston structure 64 is moved upwardly (i.e., in a bounce direction) through the interior of the cylinder 18, as indicated by the arrows 118 in FIG. 4, compressible liquid 120 is forced downwardly through the piston structure passageway system from the bounce subchamber 20a into the rebound subchamber 20b. Conversely, when the piston structure 64 is moved downwardly (i.e., in a rebound direction) through the interior of the cylinder 18, as indicated by the arrow 122 in FIG. 4A, compressible liquid 120 is forced downwardly through the piston structure passageway system from the rebound subchamber 20b into the bounce subchamber 20a.

According to a key aspect of the present invention, an annular damper valve member 124 is captively and coaxially retained within the valve chamber 110 for liquid-driven movement between the upper and lower annular end surfaces 106,88 of the valve chamber 110. As subsequently described herein, the damper valve 124 cooperates with the aforementioned piston structure passageway system to restrict liquid flow through the passageway system in a manner providing greater damping resistance to liquid flow in one direction between the bounce and rebound subchambers 20a,20b than in the other direction.

Figure 4A:
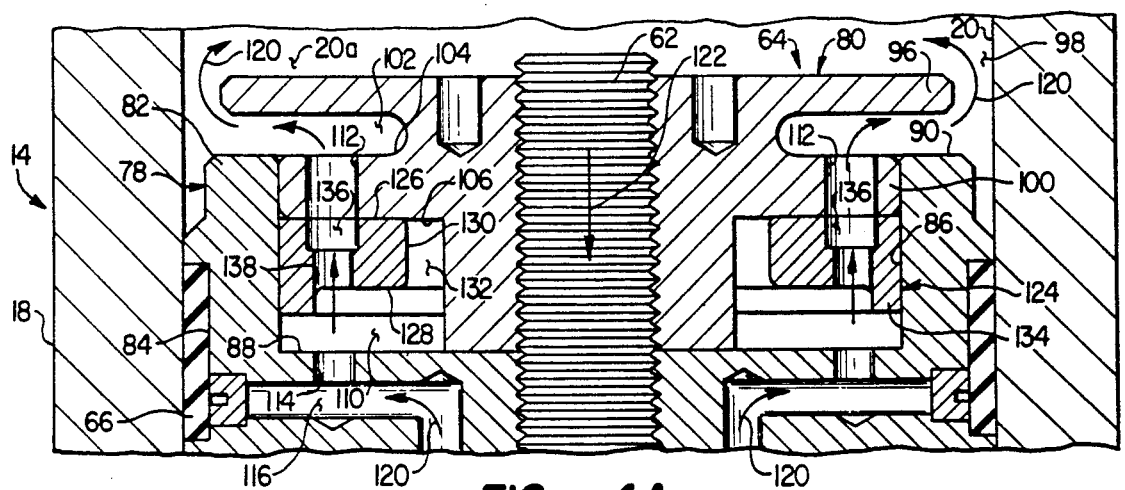

In its operating orientation shown in FIGS. 4 and 4A, the damper valve 124 is operative to provide a resistance to liquid flow from the rebound subchamber 20b into the bounce subchamber 20a which is greater than the resistance to liquid flow from the bounce subchamber 20a into the rebound subchamber 20b. Accordingly, the liquid spring 14 depicted in FIGS. 4 and 4A has a reactive damping force which is greater in its rebound stroke than in its bounce stroke. As subsequently described, however, the damper valve 124 may be reversed within the valve chamber 110 to reverse this directional liquid flow resistance differential of the valve.

With continued reference to FIGS. 4 and 4A, the damper valve 124 has an outer peripheral side surface that slidably engages the radially outer side surface of the valve chamber 110; an annular side surface 126 facing the annular upper end surface 106 of the valve chamber 110; an annular side surface 128 facing the annular lower end surface 88 of the valve chamber; a radially inner side surface 130 defining with the locking member portion 108 an annular passage 132 through the valve; an annular peripheral standoff lip 134 projecting downwardly from the valve side surface 128; an annular channel 136 formed in valve side surface 126; and a circumferentially spaced series of passages 138 extending axially inwardly through the valve side surface 128 into the channel 136.

As the piston structure 64 moves upwardly through its bounce stroke, liquid 120 moving downwardly through the piston structure passageway system moves the damper valve 124 downwardly through the valve chamber 110 causing the valve lip 134 to bottom out against the bottom end surface 88 of the valve chamber as shown in FIG. 4. With the damper valve 124 in this lower limit position, liquid 12 from the bounce subchamber 20a is forced into the rebound subchamber 20b sequentially via the annular clearance space 98; the annular locking member groove 102; the passages 112 in the locking member; simultaneously through the valve passages 132, and the channel 136 and the passages 138; the piston member passages 114; and through the passages 116 into the rebound subchamber 20b through the lower end of the piston member portion 94.

It should be noted that as the liquid 120 downwardly traverses the valve chamber 110, it does through via two parallel flow path portions - namely, (1) directly through the valve channel 136 and the underlying passages 138, and (2) radially inwardly across the top of the downwardly shifted valve, axially through the annular inner valve passage 132, and radially outwardly through the space beneath the valve maintained by the lip 134 - before downwardly exiting the valve chamber 110 via the passages 114.

However, as the piston structure 64 moves downwardly through its rebound stroke (FIG. 4A) the damper valve 124 is liquid-driven to its indicated uppermost position in the valve chamber in which the top side surface 126 of the damper valve sealingly abuts the top end surface 106 of the valve chamber. In this position of the valve 124, liquid 120 can upwardly exit the valve chamber 110 only through the valve passages 138 and the overlying annular channel 136. The previously existing parallel flow path around the valve (as in FIG. 4) is now closed off by the sealing interengagement between the valve chamber surface 106 and the valve side surface 126. Accordingly, the upward flow of liquid 120 through the piston structure 64 passageway system shown in FIG. 4A is subjected to significantly more valve-created resistance than downward liquid flow is.

Figure 5:
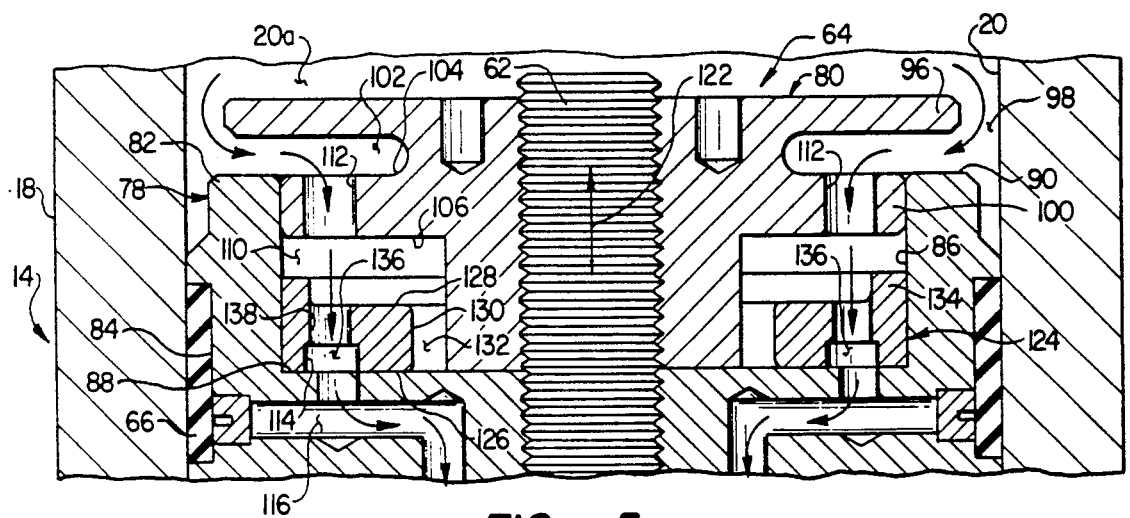
FIGS. 5 and 5A are partially elevational cross-sectional views respectively similar to those in FIGS. 4 and 5, but with the damper valve reversed within an internal valve chamber portion of the reciprocable piston structure portion of the liquid spring.
Figure 5A:
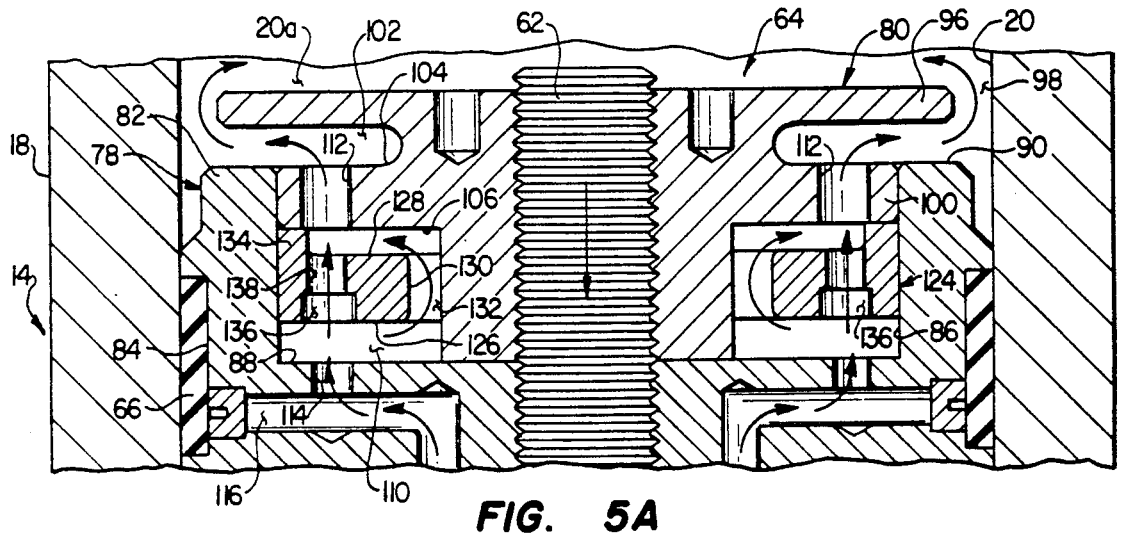

As previously mentioned, this directional flow resistance differential of the damper valve 124 may be reversed simply by axially reversing the valve within the valve chamber 110, so that the valve lip 134 faces upwardly, as illustrated in FIGS. 5 and 5A. With the valve 124 so reversed, as the piston structure 64 moves upwardly through its bounce stroke (FIG. 5) the damper valve 124 is liquid-driven to a lower limit position in which the valve side surface 126 sealingly abuts the bottom end surface 88 of the valve chamber 110. This permits the liquid 120 downwardly traversing the valve chamber to exit the chamber only via the valve channel 136 and its overlying passages 138 as indicated. However, when the piston structure 64 moves downwardly through its rebound stroke (FIG. 5A) the damper valve 124 is liquid-driven upwardly until the valve lip 134 abuts the top end surface 106 of the valve chamber. With the reversed valve in this upper limit position, liquid 120 upwardly traverses the valve chamber 110 through the valve channel 136 and passages 138 as well as around the valve, upwardly through the inner annular valve passage 132, and across the top of the valve as indicated. Accordingly, the reversed valve 124 provides the liquid spring with a bounce damping force greater than its rebound dampinq force. The reversible valve 124 thus advantageously permits the bounce/rebound damping force differential to be conveniently reversed.

It is an important feature of the present invention that the sliding damper valve 124 is protectively disposed in the valve chamber 110 within the interior of the piston structure 64 instead of being conventionally positioned between the piston apparatus and the closure member and subject to being forcibly slammed between these two elements when the piston is driven to the limit of its rebound stroke. Disposed as it is within the protective internal valve chamber 110, the damper valve 124 is subjected to far less mechanical impact force, thereby significantly prolonging its useful operating life.

As the piston structure 64 is downwardly approaches the lower limit of its rebound stroke the reduced diameter lower piston member end portion 94 enters and is closely received within the tubular body portion 54 of the resilient cushioning member 52. When the piston structure reaches its lower limit position, as depicted in FIG. 2, the annular underside surface 92 of the piston member 78 is brought in to cushioning abutment with the flanqe portion 58 of the cushioning member, thereby preventing metal-to-metal impact between the piston member 78 and the closure member 30.

As the piston member portion 94 sealingly enters the cushioning member body portion 54, the piston structure passageway system functions as a pressure relief passage through which liquid in the tubular body 54 is upwardly driven to protect the rod seal structure from damage from liquid pressure spikes which could otherwise result from suddenly compressing the liquid in such tubular body portion. According to another feature of the invention, the sealing and pressure relief structure entering the tubular body portion 54 is a fixed, integral part of the piston structure, as opposed to being a damper valve slidably carried externally of the piston structure, thereby advantageously affording a stronger, more durable overall liquid spring structure. Additionally, this improved sealing and pressure relief structure, together with the balance of the piston structure, is further protected against rigid impact damage by the use of the resilient cushioning member 52 which acts as a resilient bumper between the rigid piston structure 64 and the rigid closure member 30.

The foregoing detailed description is to be clearly understood as being given by way of illustration and example only, the spirit and scope of the present invention being limited solely by the appended claims.

WHAT IS CLAIMED IS:
1. A liquid spring comprising:
a cylinder structure having a chamber disposed therein and containing a compressible liquid:
a piston structure reciprocably disposed within said chamber and dividing it into bounce and rebound subchambers;
a rod longitudinally extending along an axis and being slidably and sealingly carried by said cylinder structure for axial movement into and out of said chamber, said rod being fixedly secured at an inner end thereof to said piston structure and having an outer end portion disposed outwardly of said cylinder structure;

passage means extending through said piston structure and intercommunicating said bounce and rebound subchambers, said passage means being operative to permit compressible liquid to flow therethrough from said bounce subchamber into said rebound subchamber in response to axial movement of said rod into said chamber, and to permit compressible liquid to flow therethrough from said rebound subchamber into said bounce subchamber in response to axial movement of said rod out of said chamber, an axially intermediate portion of said passage means being defined by a valve chamber disposed within the interior of said piston structure;

damper valve means, protectively retained within said valve chamber for fluid-driven axial movement therein between first and second limit positions in respective response to forced movement of said piston structure relative to said cylinder structure in first and second opposite axial directions, said damper valve means being operative to restrict liquid flow through said passage means, in a manner providing greater resistance to liquid flow in one direction between said bounce and rebound subchambers than in the other direction, by limiting liquid flow through said valve chamber to a first positive flow rate when said damper valve means are in said first limit position thereof, and limiting liquid flow through said valve chamber to a second, different positive flow rate when said damper valve means are in said second limit position thereof, said valve chamber having an annular configuration, circumscribing said axis, and axially spaced apart opposing first and second annular end surfaces, said damper valve means including an annular damper valve member coaxially and slidably received within said valve chamber for liquid-driven axial movement relative to said piston structure between a first position in which said damper member abuts said first annular end surface of said valve chamber, and a second position in which said damper valve member abuts said second end surface of said valve chamber, said valve chamber having an annular radially inner side surface and an annular radially outer side surface, said damper valve member having a radially inner side surface with a diameter larger than that of said radially inner side surface of said valve chamber, a radially outer side surface slidably engaging said radially outer side surface of said valve chamber, first and second opposite annular end surfaces, and annular peripheral standoff lip projecting axially outwardly beyond said first end surface and said damper valve member toward one of said first and second end surfaces of said valve chamber, and at least one liquid flow passage extending between said first and second damper valve member end surfaces radially inwardly of said peripheral standoff lip, said passage means having portions extending outwardly through said first and second valve chamber end surfaces at locations disposed radially inwardly of said peripheral standoff lip and radially outwardly of said radially inner side surface of said damper valve member;

a generally cylindrical piston member coaxially anchored to said inner end of said rod, said piston member having an inner end face through which a central cylindrical opening inwardly extends, said central cylindrical opening having an inner end surface which defines said first end surface of said valve chamber, and an annular side surface which defines said radially outer side surface of said valve chamber; and a locking member removably secured to said inner end of said rod, said locking member having a first cylindrical portion closely and coaxially received in an outer end portion of said central cylindrical opening and having an inner side surface which defines said second end surface of said valve chamber, and a reduced diameter second cylindrical portion extending coaxially into said central cylindrical opening and having an outer side surface which defines said radially inner side surface of said valve chamber.

2. A liquid spring suspension system for use on a vehicle having a frame and a wheel structure, said suspension system comprising:

a liquid spring having:

a cylinder structure having a chamber disposed therein and containing a compressible liquid, a piston structure reciprocably disposed within said chamber and dividing it into bounce and rebound subchambers, a rod longitudinally extending along an axis and being slidably and sealingly carried by said cylinder structure for axial movement into and out of said chamber, said rod being fixedly secured at an inner end thereof to said piston structure and having an outer end portion disposed outwardly of said cylinder structure, passage means extending through said piston structure and intercommunicating said bounce and rebound subchambers, said passage means being operative to permit compressible liquid to flow therethrough from said bounce subchamber into said rebound subchamber in response to axial movement of said rod into said chamber, and to permit compressible liquid to flow therethrough from said rebound subchamber into said bounce subchamber in response to axial movement of said rod out of said chamber, an axially intermediate portion of said passage means being defined by a valve chamber disposed within the interior of said piston structure, and damper valve means, protectively retained within said valve chamber for fluid-driven axial movement therein between first and second limit positions in respective response to forced movement of said piston structure relative to said cylinder structure in first and second opposite axial directions, said damper valve means being operative to restrict liquid flow through said passage means, in a manner providing greater resistance to liquid flow in one direction between said bounce and rebound subchambers than in the other direction, by limiting liquid flow through said valve chamber to a first positive flow rate when said damper valve means are in said first limit position thereof, and limiting liquid flow through said valve chamber to a second, different positive flow rate when said damper valve means are in said second limit position thereof;

means for operatively associating said cylinder structure and said rod with said frame and said wheel structure in a manner such that relative vertical movement between said frame and said wheel structure causes relative axial translation between said cylinder structure and said rod, said valve chamber having an annular configuration, circumscribes said axis, and has axially spaced apart opposing first and second annular end surfaces, and said damper valve means including an annular damper valve member coaxially and slidably received within said valve chamber for liquid-driven axial movement relative to said piston structure between a first position in which said damper member abuts said first annular end surface of said valve chamber, and a second position in which said damper valve member abuts said second end surface of said valve chamber.

said valve chamber having an annular radially inner side surface and an annular radially outer side surface, said damper valve member having a radially inner side surface with a diameter larger than that of said radially inner side surface of said valve chamber, a radially outer side surface slidably engaging said radially outer side surface of said valve chamber, first and second opposite annular end surfaces, an annular peripheral standoff lip projecting axially outwardly beyond said first end surface of said damper valve member toward one of said first and second end surfaces of said valve chamber, and at least one liquid flow passage extending between said first and second damper valve member end surfaces radially inwardly of said peripheral standoff lip, and said passage means having portions extending outwardly through said first and second valve chamber end surfaces at locations disposed radially inwardly of said peripheral standoff lip and radially outwardly of said radially inner side surface of said damper valve member;

a generally cylindrical piston member coaxially anchored to said inner end of said rod, said piston member having an inner end face through which a central cylindrical opening inwardly extends, said central cylindrical opening having an inner end surface which defines said first end surface of said valve chamber, and an annular side surface which defines said radially outer side surface of said valve chamber; and a locking member removably secured to said inner end of said rod, said locking member having a first cylindrical portion closely and coaxially receiving in an outer end portion of said central cylindrical opening and having an inner side surface which defines said second end surface of said valve chamber, and a reduced diameter second cylindrical portion extending coaxially into said central cylindrical opening and having an outer side surface which defines said radially inner side surface of said valve chamber.

* * * * *